(12) United States Patent
Doerr et al.

(10) Patent No.: US 11,328,587 B2
(45) Date of Patent: May 10, 2022

(54) METHOD AND SYSTEM FOR CONFIRMING THE IDENTITY OF A VEHICLE

(71) Applicant: Robert Bosch GmbH, Stuttgart (DE)

(72) Inventors: Alfons Doerr, Stuttgart (DE); Buelent Barcin, Kirchheim/Jesingen (DE); Eberhard Kuemmel, Allmersbach (DE); Jochen Luik, Plochingen (DE); Sebastian Schulze, Reichenbach (DE); Ulf Kleuker, Gerlingen (DE); Klaus Treiber, Neckartenzlingen (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 16/769,452

(22) PCT Filed: Nov. 12, 2018

(86) PCT No.: PCT/EP2018/080929
§ 371 (c)(1),
(2) Date: Jun. 3, 2020

(87) PCT Pub. No.: WO2019/110247
PCT Pub. Date: Jun. 13, 2019

(65) Prior Publication Data
US 2021/0192938 A1   Jun. 24, 2021

(30) Foreign Application Priority Data
Dec. 7, 2017   (DE) .............................. 102017222129

(51) Int. Cl.
*G08G 1/01*   (2006.01)
*G08G 1/017*   (2006.01)
(Continued)

(52) U.S. Cl.
CPC .............. *G08G 1/017* (2013.01); *B60L 53/14* (2019.02); *B60L 53/65* (2019.02); *B60S 5/02* (2013.01);
(Continued)

(58) Field of Classification Search
CPC ........ G08G 1/017; H04W 4/44; H04W 12/71; B60L 53/14; B60L 53/65; B60L 2240/70; B60S 5/02; G01M 15/10; G07C 5/008
(Continued)

(56) References Cited

U.S. PATENT DOCUMENTS 10,318,963 B1 * 6/2019 Prasad ................. G06Q 30/018
2004/0015278 A1 * 1/2004 Gordon, Jr. ......... G01M 15/102
701/31.4
(Continued)

FOREIGN PATENT DOCUMENTS

DE   102015224887 A1   6/2017

OTHER PUBLICATIONS

International Search Report for PCT/EP2018/080929, dated Feb. 26, 2019.

*Primary Examiner* — Zhen Y Wu
(74) *Attorney, Agent, or Firm* — Norton Rose Fulbright US LLP; Gerard Messina

(57) ABSTRACT

A system for confirming the identity of a vehicle. The device includes: a vehicle control unit in the vehicle to be identified; a vehicle identification device; an external service device designed to interact with the vehicle; a vehicle sensor in the vehicle; and an external sensor. The vehicle identification device establishes a data connection with the vehicle control unit and triggers a physical interaction between the vehicle control unit and the external service device. The vehicle sensor detects the physical interaction and transmits a corresponding vehicle detection value to the vehicle identifi- (Continued)

cation device. The external sensor detects the physical interaction and transmits a corresponding external detection value to the vehicle identification device; and the vehicle identification device compares the vehicle detection value and the external detection value with one another and confirms the identity of the vehicle if the two detection values coincide with one another within a predefined tolerance.

10 Claims, 3 Drawing Sheets

(51) Int. Cl.
*H04W 4/44* (2018.01)
*B60L 53/14* (2019.01)
*B60L 53/65* (2019.01)
*H04W 12/71* (2021.01)
*B60S 5/02* (2006.01)
*G01M 15/10* (2006.01)
*G07C 5/00* (2006.01)

(52) U.S. Cl.
CPC ............. *H04W 4/44* (2018.02); *H04W 12/71* (2021.01); *B60L 2240/70* (2013.01); *G01M 15/10* (2013.01); *G07C 5/008* (2013.01)

(58) Field of Classification Search
USPC .......................................................... 340/933
See application file for complete search history.

(56) References Cited

U.S. PATENT DOCUMENTS

| | | | | |
|---|---|---|---|---|
| 2010/0299017 | A1* | 11/2010 | Hansen | G06F 16/252 701/31.4 |
| 2015/0057875 | A1* | 2/2015 | McGinnis | G07C 5/0841 701/31.6 |
| 2015/0356795 | A1* | 12/2015 | Warren | G08G 1/096725 701/31.5 |
| 2016/0330204 | A1* | 11/2016 | Baur | H04L 63/0823 |
| 2017/0372161 | A1* | 12/2017 | Almeida | G06K 9/00785 |
| 2018/0012433 | A1* | 1/2018 | Ricci | G06F 16/248 |
| 2019/0154453 | A1* | 5/2019 | Leone | G05D 1/0088 |
| 2019/0187029 | A1* | 6/2019 | Kanbayashi | G01M 17/025 |

* cited by examiner

METHOD AND SYSTEM FOR CONFIRMING THE IDENTITY OF A VEHICLE

FIELD

The present invention relates to a method and to a system for confirming the identity of a vehicle.

BACKGROUND INFORMATION

For a multitude of service applications in the automotive sector, it is necessary or at least desirable to identify the relevant vehicle and to confirm the identity of the vehicle.

This previously required an interaction with the driver of the vehicle, for example, via RFID transponders and/or via the input of a secret code (pin-code). This is complex and prone to error.

An object of the present invention is therefore to improve the identification of a vehicle and the confirmation of the identity of the vehicle.

SUMMARY

According to one exemplary embodiment of the present invention, a method of confirming the identity of a vehicle includes establishing a data connection to a vehicle control unit installed in the vehicle to be identified; triggering a physical interaction via the data connection between the vehicle and an external service device; detecting the physical interaction via a vehicle sensor installed in the vehicle and providing a corresponding vehicle detection value; detecting the physical interaction also via an external sensor, i.e., a sensor, which is situated outside the vehicle and providing a corresponding external detection value; comparing the vehicle detection value with the external detection value and confirming the identity of the vehicle (only) if the vehicle detection value coincides with the external detection value within a predefined tolerance.

A system for confirming the identity of a vehicle according to one exemplary embodiment of the present invention includes: a vehicle control unit installed in the vehicle to be identified; a vehicle identification device, which is situated outside the vehicle; an external service device, which is situated outside the vehicle and is designed to physically interact with the vehicle; a vehicle sensor installed in the vehicle; and an external sensor, which is situated outside the vehicle. The vehicle identification device is designed to establish a data connection with the vehicle control unit and to trigger a physical interaction via the data connection between the vehicle control unit and the external service device. The vehicle sensor is designed to detect the physical interaction and to transmit a corresponding vehicle detection value to the vehicle identification device. The external sensor is designed to detect the physical interaction and to transmit a corresponding external detection value to the vehicle identification device. The vehicle identification device is designed to compare the vehicle detection value and the external detection value with one another and to confirm the identity of the vehicle (only) if the two detection values coincide with one another within a predefined tolerance.

According to one basic feature of the present invention, an external service device establishes a read and/or write access ("data connection") to a vehicle to be identified, in particular, to a diagnostic interface of the vehicle, and initiates a controllable physical interaction between the vehicle and an external service device. The physical interaction triggered in this way is detected in the next step by an external sensor, i.e., by a sensor outside the vehicle, and by a vehicle sensor installed in the vehicle, independently of one another, and the measured values determined by the sensors are provided independently of one another via two redundant information channels to a vehicle identification device where they are compared with one another. The identity of the vehicle is confirmed only if the two measured values coincide with one another within a predefined tolerance.

The vehicle identification device may be integrated into the vehicle or into the service device.

Manual identification and authorization processes are omitted as a result of a method and a system according to exemplary embodiments of the present invention. The risk of misallocations or manipulations of billings and/or test results may thus be reduced.

Vehicles and service products may be interlinked and data, functions, interfaces and computing power may be more flexibly distributed based on a reliable vehicle identification as it is enabled by a method and a system according to one exemplary embodiment of the present invention.

In one specific embodiment of the present invention, the vehicle detection value is transmitted from the vehicle to the vehicle identification device via a virtual cloud, in particular, via a virtual cloud of the vehicle manufacturer. In this way, it is possible to additionally monitor and authorize the data transmission from the vehicle to the vehicle identification device.

In one specific embodiment of the present invention, the physical interaction is triggered by influencing sensors of a driver assistance system installed in the vehicle. By influencing the sensors of a driver assistance system installed in the vehicle, it is possible to trigger the physical interaction in a particularly simple and efficient manner.

In one specific embodiment of the present invention, the external service device is an electrical charging station, and the detected physical interaction is an electrical charge current flowing between the charging station and the vehicle. In this way, the charging of an electric vehicle may be effectively authorized and monitored.

In one specific embodiment of the present invention, the external service device is a fuel pump, and the detected physical interaction is a fuel flow from the fuel pump into the vehicle. In this way, the refueling of a vehicle that includes an internal combustion engine may be effectively authorized and monitored.

In one specific embodiment of the present invention, the external service device is an exhaust gas measuring device, and the physical interaction is an exhaust gas flow of the vehicle. In this way, the vehicle may be reliably identified during an exhaust gas measurement, and manipulations during the exhaust gas measurement may be impeded.

In one specific embodiment of the present invention, the data connection is a radio link, so that the installation of a data cable between the vehicle and the service device may be dispensed with.

In one specific embodiment of the present invention, the data connection is an encrypted connection, so that an unauthorized tapping and/or manipulation of the data transmitted via the data connection may be reliably prevented. The keys necessary for encryption and decryption may, for example, be stored in the cloud of the vehicle manufacturer and/or in a cloud of the service provider.

In one specific embodiment of the present invention, the vehicle identification device has access to a database containing pieces of vehicle information. The database may, in particular, be part of a virtual cloud of the vehicle manufacturer and/or of the service provider. With pieces of vehicle information, which are stored in a database, in particular, in a virtual cloud and are accessible to the vehicle identification device, it is possible to enhance still further the reliability, since the pieces of vehicle information stored in the database may be compared with data transmitted from the vehicle control unit, in order to check the identity of the vehicle.

Exemplary embodiments of the present invention are described below with reference to the figures.

DETAILED DESCRIPTION OF EXAMPLE EMBODIMENTS

Figure 1:
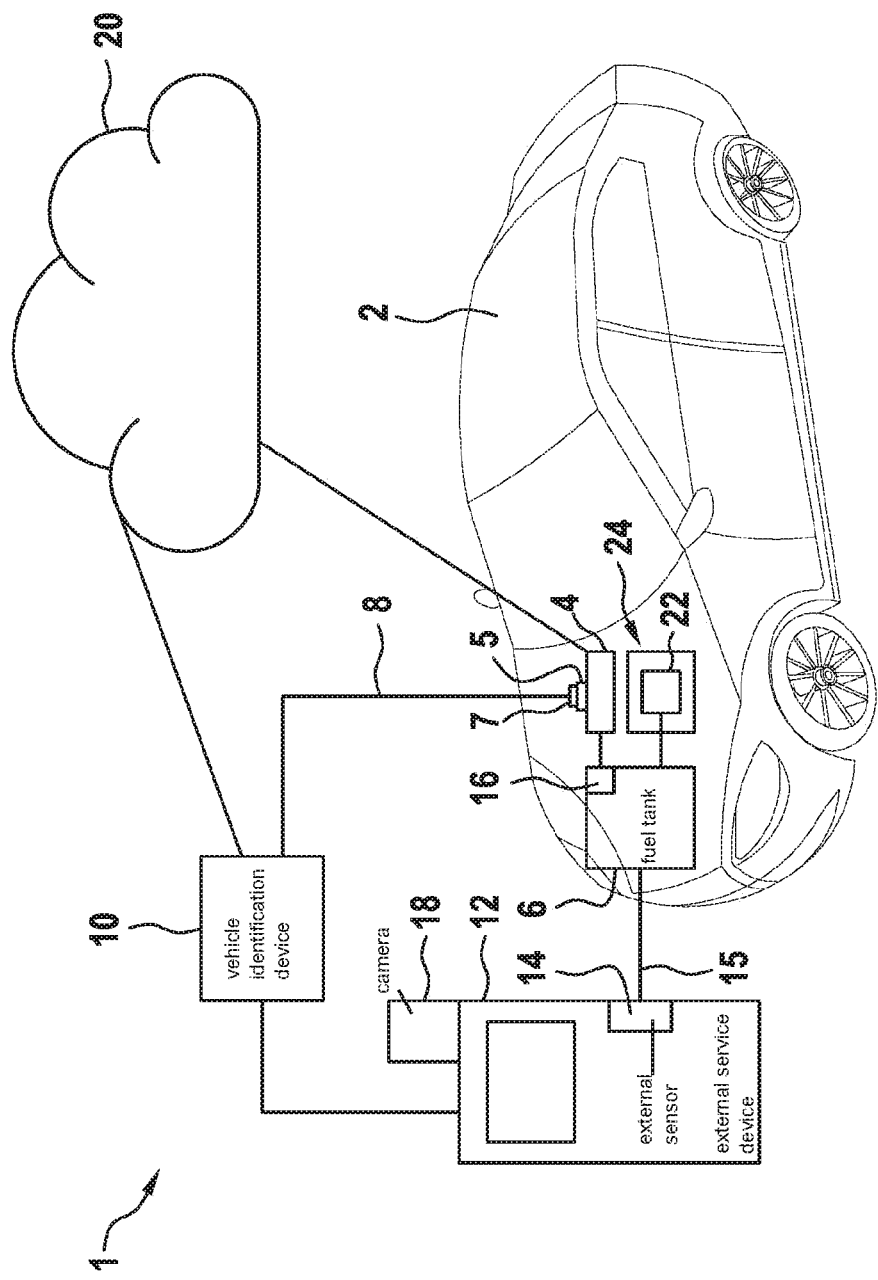
FIG. 1 schematically shows a representation of a system for confirming the identity of a vehicle according to a first exemplary embodiment.
Figure 2:
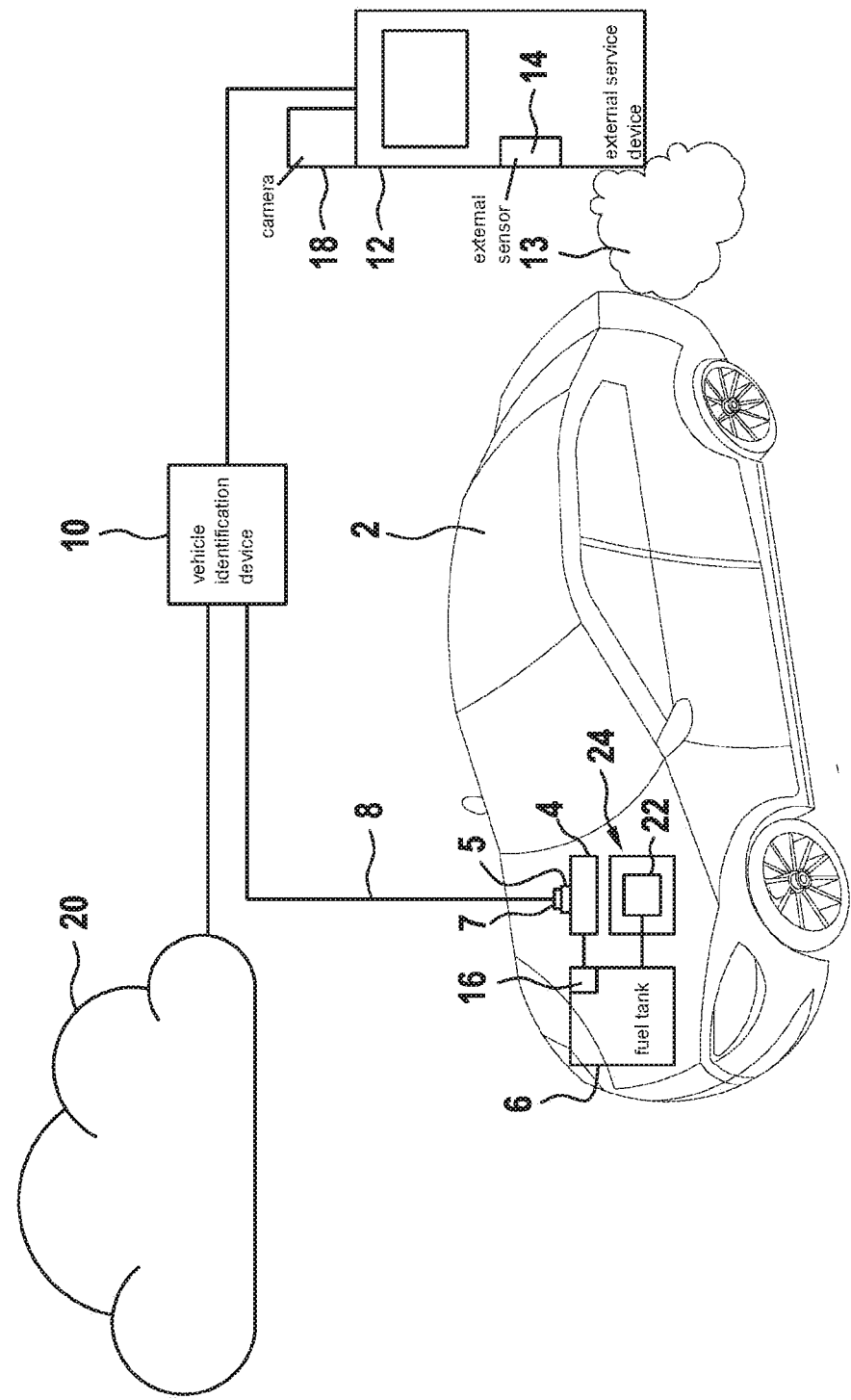
FIG. 2 schematically shows a representation of a system for confirming the identity of a vehicle according to a second exemplary embodiment of the present invention.

FIGS. 1 and 2 each show in a schematic representation a system 1 for confirming the identity of a vehicle 2 according to one exemplary embodiment of the present invention.

System 1 includes a vehicle control unit 4 installed in the vehicle to be identified as well as a vehicle identification device 10.

Vehicle control unit 4 and vehicle identification device 10 are connected to one another via a data connection 8. Data connection 8 may be a hardwired data connection 8 or a wireless data connection 8. Data connection 8 may, for example, be established via mobile transceiver device (Dongle) 7, which is inserted into an OBD socket 5 of vehicle 2. Alternatively, transceiver device 7 may be permanently integrated into vehicle control unit 6 for establishing data connection 8.

System 1 further includes an external service device 12, which is designed to physically interact 15 with vehicle 2. External service device 12 may, for example, be a current charging station 12 for charging a rechargeable battery 6 installed in vehicle 2 designed as an electric vehicle, or a fuel pump 12 for refueling a fuel tank 6 installed in vehicle 2 (see FIG. 1). Service device 12 may also be an exhaust gas measuring device 12 for measuring exhaust gases 13 of vehicle 2 (see FIG. 2).

An external sensor 14, present at or in external service device 12, is designed to measure physical interaction 15 between external service device 12 and vehicle 2, for example, the electric current flowing from a charging station 12 to a rechargeable battery 6 in vehicle 2, the fuel flowing from a fuel pump 12 into a fuel tank 6, or exhaust gases 13 emitted by vehicle 2.

A vehicle sensor 16, installed in vehicle 2, is also designed to measure physical interaction 15 between external service device 12 and vehicle 2, for example, the electric current flowing from a charging station 12 to a rechargeable battery 6 in vehicle 2, the fuel flowing from a fuel pump 12 into a fuel tank 6, or exhaust gases 13 emitted by vehicle 2.

To confirm the identity of vehicle 2, vehicle identification device 10 establishes data connection 8 with vehicle control unit 4. Once data connection 8 has been established, a physical interaction 15, for example a fueling or charging process, is triggered by vehicle identification device 10 via data connection 8 between vehicle 2 and external service device 12. Physical interaction 15 may also include the operation of an engine of vehicle 2 at a predefined rotational speed.

Vehicle sensor 16 also detects physical interaction 15, for example, the current transmitted to vehicle 2, the quantity of fuel flowing into fuel tank 6 of vehicle 2, or exhaust gases 13 emitted by the engine of vehicle 2, and vehicle control unit 4 transmits via data connection 8 a vehicle detection value determined in this manner to vehicle identification device 10.

External sensor 14 also detects physical interaction 15, and external service device 12 transmits a detection value determined in this manner to vehicle identification device 10.

Vehicle identification device 10 compares the vehicle detection value with the external detection value and confirms the identity of vehicle 2 if the two detection values coincide with one another within a predefined tolerance.

Vehicle control unit 4 and/or vehicle identification device 10 may also be connected to a database/cloud 20, which contains pieces of information about vehicle 2.

Database/cloud 20 may, for example, contain identification data and/or keys, which enable vehicle identification 10 to identify vehicle 2 and/or vehicle control unit 4 and/or to communicate with vehicle control unit 4 via an encrypted data connection 8.

Database/cloud 20 may further be designed to document and/or to bill the service performed by service device 12, for example, the current or fuel supplied by service device 12 to vehicle 2.

Database/cloud 20 may also contain pieces of information about the locations of service devices 12, in order to enable vehicle control unit 4 to establish a data connection 8 with the nearest service device 12.

In one exemplary embodiment of the present invention, service device 12 also includes a camera 18, which makes it possible to record at least one image of vehicle 2 if it is located in the surroundings of service device 12, and to transmit the image data to vehicle identification device 10. Vehicle identification device 10 may store the image data supplied by camera 18 together with the data measured by external sensor 14 for purposes of documentation and/or may prompt the owner of vehicle 2, for example, via his/her smartphone, to identify his/her vehicle 2 based on an image of vehicle 2 recorded by camera 18 and presented to the owner of vehicle 2, and to authorize planned physical interaction 15, for example, the charging, fueling or exhaust gas measuring process.

The triggering of physical interaction 15 between vehicle 2 and service device 12 may take place directly via vehicle control unit 6 as it was previously described.

In one alternative embodiment of the present invention, vehicle identification device 10 and/or vehicle control unit 6 may influence at least one sensor 22 of a driver assistance system 24 installed in vehicle 2, in order to prompt driver assistance system 24 to trigger desired physical interaction 15.

Load changes for the diagnosis may also be triggered in vehicle 2 in parallel to the triggered service. In addition, additional off-board and on-board diagnostic processes may be started and varied via data connection 8 and may be comprehensively compared with other data, classified and evaluated in detail in database/cloud 20. Additional services such as, for example, the reading out of data loggers in vehicle 2 or the flashing of software of vehicle control unit 6 may also be offered.

Figure 3:
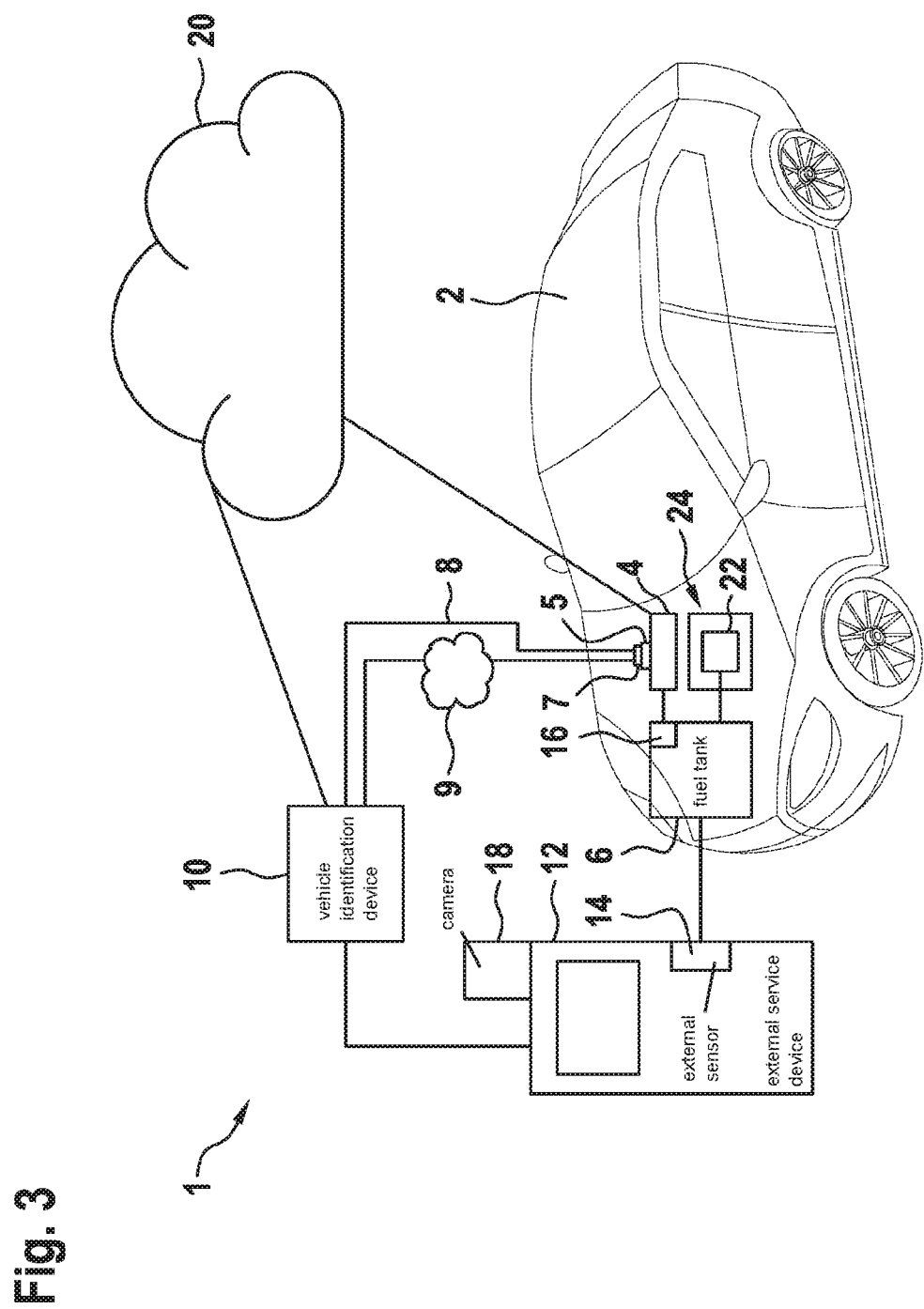
FIG. 3 schematically shows a representation of a system for confirming the identity of a vehicle according to a third exemplary embodiment of the present invention.

FIG. 3 shows a further exemplary embodiment of a system for confirming the identity of a vehicle in accordance with the present invention. The features that coincide with those shown in FIGS. 1 and 2 are provided with the same reference numerals and are not described again in detail.

In the exemplary embodiment shown in FIG. 3, the feedback of vehicle control unit 6 to vehicle identification device 10, i.e., the transmission of the data measured by vehicle sensor 16 does not take place via the previously described direct data connection 8 between vehicle control unit 4 and vehicle identification device 10, but via a cloud 9, in particular, a cloud 9 of the vehicle manufacturer. The use of a cloud 9, in particular, of a cloud 9 of the vehicle manufacturer, increases the reliability of the method, since the identity of vehicle 2 and/or the identity of vehicle identification device 10 may be checked and confirmed by the vehicle manufacturer.

What is claimed is:

1. A method for confirming an identity of a vehicle, the method comprising the following steps:
    establishing a data connection to a vehicle control unit installed in the vehicle to be identified;
    triggering a physical interaction between the vehicle and an external service device;
    detecting the physical interaction via a vehicle sensor installed in the vehicle and providing a corresponding vehicle detection value;
    detecting the physical interaction via an external sensor and providing a corresponding external detection value;
    comparing the vehicle detection value with the external detection value; and
    confirming the identity of the vehicle only based on the vehicle detection value coinciding with the external detection value within a predefined tolerance.

2. The method as recited in claim 1, wherein the physical interaction is triggered by influencing sensors of a driver assistance system installed in the vehicle.

3. A method for confirming an identity of a vehicle, the method comprising the following steps:
    establishing a data connection to a vehicle control unit installed in the vehicle to be identified;
    triggering a physical interaction between the vehicle and an external service device;
    detecting the physical interaction via a vehicle sensor installed in the vehicle and providing a corresponding vehicle detection value;
    detecting the physical interaction via an external sensor and providing a corresponding external detection value;
    comparing the vehicle detection value with the external detection value; and
    confirming the identity of the vehicle based on the vehicle detection value coinciding with the external detection value within a predefined tolerance,
    wherein the vehicle detection value is provided via a virtual cloud of a vehicle manufacturer.

4. A system for confirming an identity of a vehicle, the system comprising:
    a vehicle control unit installed in the vehicle to be identified;
    a vehicle identification device;
    an external service device which is configured to physically interact with the vehicle;
    a vehicle sensor installed in the vehicle; and
    an external sensor;
    wherein the vehicle identification device is configured to establish a data connection with the vehicle control unit, and to trigger a physical interaction between the vehicle control unit and the external service device;
    wherein the vehicle sensor is configured to detect the physical interaction and to transmit a corresponding vehicle detection value to the vehicle identification device;
    wherein the external sensor is configured to detect the physical interaction and to transmit a corresponding external detection value to the vehicle identification device; and
    wherein the vehicle identification device is configured to compare the vehicle detection value and the external detection value with one another and to confirm the identity of the vehicle only if the two detection values coincide with one another within a predefined tolerance.

5. The system as recited in claim 4, wherein the external service device is an electrical charging station, and the physical interaction is an electrical charge current between the charging station and the vehicle.

6. The system as recited in claim 4, wherein the external service device is a fuel pump, and the physical interaction is a fuel flow from the fuel pump into the vehicle.

7. The system as recited in claim 4, wherein the data connection is a radio link and/or an encrypted connection.

8. The system as recited in claim 4, wherein the vehicle identification device has access to a database which contains pieces of vehicle information.

9. The system as recited in claim 8, wherein the database is part of a virtual cloud.

10. A system, the system comprising:
    a vehicle control unit installed in the vehicle to be identified;
    a vehicle identification device;
    an external service device which is configured to physically interact with the vehicle;
    a vehicle sensor installed in the vehicle; and
    an external sensor;
    wherein the vehicle identification device is configured to establish a data connection with the vehicle control unit, and to trigger a physical interaction between the vehicle control unit and the external service device;
    wherein the vehicle sensor is configured to detect the physical interaction and to transmit a corresponding vehicle detection value to the vehicle identification device;
    wherein the external sensor is configured to detect the physical interaction and to transmit a corresponding external detection value to the vehicle identification device; and
    wherein the vehicle identification device is configured to compare the vehicle detection value and the external detection value with one another and to confirm the identity of the vehicle if the two detection values coincide with one another within a predefined tolerance,
    wherein the external service device is an exhaust gas measuring device, and the physical interaction is an exhaust gas flow of the vehicle.

* * * * *